United States Patent [19]
Wachter et al.

[11] Patent Number: 6,153,552
[45] Date of Patent: *Nov. 28, 2000

[54] METHODS FOR MAKING CATALYSTS

[75] Inventors: William A. Wachter; Jeffrey T. Elks, both of Baton Rouge, La.; Stephen Neil Vaughn, Kingwood, Tex.

[73] Assignee: Exxon Chemical Patents Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,030

[22] Filed: Oct. 29, 1997

[51] Int. Cl.[7] .................................................. B01J 27/14
[52] U.S. Cl. ...................... 502/208; 502/214; 423/239.1; 423/239.2; 423/299; 423/317; 423/324; 423/328.1; 423/328.2
[58] Field of Search .............................. 423/239.1, 239.2, 423/299, 317, 324, 328.1, 328.2; 502/60, 62, 64, 66, 208, 214

[56] References Cited

U.S. PATENT DOCUMENTS

| | | | |
|---|---|---|---|
| 4,358,397 | 11/1982 | Chu | 252/437 |
| 4,440,871 | 4/1984 | Lok et al. | 502/214 |
| 4,458,023 | 7/1984 | Welsh et al. | 502/65 |
| 4,564,603 | 1/1986 | Robinson et al. | 502/60 |
| 4,857,495 | 8/1989 | Gortsema et al. | 502/214 |
| 4,859,314 | 8/1989 | Pellet et al. | 208/114 |
| 4,973,792 | 11/1990 | Lewis et al. | 585/638 |
| 5,173,463 | 12/1992 | Macedo | 502/68 |
| 5,182,242 | 1/1993 | Marler | 502/66 |
| 5,286,369 | 2/1994 | Roberie et al. | 208/114 |
| 5,294,578 | 3/1994 | Ho et al. | 502/62 |
| 5,328,675 | 7/1994 | Vaughan et al. | 423/328 |
| 5,348,643 | 9/1994 | Absil et al. | 208/114 |
| 5,360,474 | 11/1994 | Lauth et al. | 106/402 |
| 5,366,948 | 11/1994 | Absil et al. | 502/68 |
| 5,430,000 | 7/1995 | Timken | 502/60 |
| 5,456,821 | 10/1995 | Absil et al. | 208/114 |
| 5,552,132 | 9/1996 | Evans | 423/701 |

OTHER PUBLICATIONS

Atlas of Zeolite Structural Types (Butterworth Heineman—3rd ed: 1997).
Zeolites, vol. 17, pp. 512–522 (1996).
Zeolites, vol. 17, pp. 212–222 (1996).

*Primary Examiner*—Tom Dunn
*Assistant Examiner*—Cam N. Nguyen
*Attorney, Agent, or Firm*—Linda Russell; Bradley Keller

[57] ABSTRACT

Catalysts that are useful for hydrocarbon conversions and oxygenate conversions, and a method for making such catalysts. The method for making the catalysts comprises forming a mixture comprising molecular sieves comprising pores having a diameter smaller than about 10 Angstroms, an inorganic sol, and an external phosphorus source, and drying the mixture.

8 Claims, No Drawings

METHODS FOR MAKING CATALYSTS

FIELD OF THE INVENTION

The present invention relates to catalysts for hydrocarbon conversions and oxygenate conversions. The present invention also provides a method for making the catalysts.

BACKGROUND OF THE INVENTION

Many hydrocarbon conversions and oxygenate conversions are used in the petrochemical, chemical and refining industries. The conversion processes produce olefins, gasoline, fuel oils, and many other valuable products. Most of the processes are catalyzed by molecular-sieve containing catalysts. Hydrocarbon cracking—a widely practiced hydrocarbon conversion—is an endothermic conversion which commonly is practiced in a fluid catalytic cracking mode (FCC) or in a moving bed cracking mode. Oxygenate conversions are exothermic conversions. Different operating modes, including fixed bed, fluidized bed and moving bed modes, also have been used and tested for oxygenate conversions. Heat must be provided for endothermic processes and must be removed for the exothermic processes. Some processes operate in an adiabatic fashion with little heat added or removed during the reaction.

Both fluidized bed and moving bed processes commonly are carried out in a cyclic mode. The hydrocarbon and oxygenate feedstocks are contacted in a reactor with hot, active catalysts particles at an elevated temperature and a modest pressure. As the feedstocks are converted to the desired valuable products, undesirable residue known as coke forms on the catalyst. The coke tends to cause the catalyst to lose its activity and become deactivated. The deactivated particulate catalysts then are disengaged from the feedstock, sometimes stripped of residual hydrocarbons, and sent to a regenerator for regeneration. Regeneration usually is carried out at elevated temperature with a controlled burn of the coke in the presence of oxygen and a diluent inert gas to minimize unintended temperature surges. In some cases, regeneration is effected by hydrogen stripping at elevated temperature.

The catalysts used in these conversions usually are fine powders with a particle size in the range of from about 20 to 250 microns in diameter, most typically averaging in the range of from about 50 to about 150 microns in diameter. If the catalyst particles are too large in diameter, then the particles will not possess the needed fluidization and other flow properties for fluidized-bed and moving-bed processes. If the particles are too small in diameter, then the particles will be carried out of the reactor by the flowing gas.

In most reactor designs, the catalyst is propelled upwardly through a riser reactor zone where the catalyst contacts a feed. The coked or deactivated catalyst particles are disengaged from the products and any un-reacted feed. After stripping, the catalyst particles are transferred to a regenerator for regeneration. The regenerated catalyst then flows downwardly from the regenerator to the bottom of the riser reactor, and the cycle is repeated.

The cycles of reaction and regeneration are carried out at high temperatures and high flow rates. Collisions and abrasions between catalyst particles themselves, between the particles and reactor walls and between the particles and other parts of the unit tend to cause physical breakdown of the original particles into smaller particles known as fines. This physical breakdown is called attrition. The fines usually have particle diameters smaller than about 20 microns—much smaller than the starting particles. Most commercial reactors are fitted with cyclones to recover the fines, and/or with electrostatic precipitators to prevent the fines from becoming airborne.

Catalysts with higher attrition resistance are desirable because, among other reasons, fewer fines are generated for disposal, less environmental impact is caused by un-recoverable airborne particulates, operating costs are lower, and less catalyst is required due to reduced catalyst consumption.

SUMMARY OF THE INVENTION

The invention provides a method for making a catalyst, comprising forming a mixture comprising a molecular sieve having a pore diameter smaller than about 10 Angstroms, an inorganic oxide sol, and an external phosphorus source; and drying the mixture.

DETAILED DESCRIPTION OF THE INVENTION

The present invention relates to hydrocarbon conversion catalysts and oxygenate conversion catalysts, and methods for making such catalysts. Hydrocarbon and oxygenate conversion catalysts, such as fluid catalytic cracking (FCC) catalysts and methanol-to-olefins (MTO) catalysts, respectively, are used most frequently in fluidized bed or moving bed systems. As a result, such catalysts constantly are exposed to harsh chemical and physical conditions both during the hydrocarbon and oxygenate conversion reactions, and during catalyst regeneration.

The present invention relates to methods for making such catalysts to increase their attrition resistance. The method of making the catalysts can be carried out in a batch, continuous, or semi-continuous mode.

Hydrocarbon conversion catalysts and oxygenate conversion catalysts generally have several components in their formulations: a microporous zeolitic or microporous non-zeolitic molecular sieve, an inorganic oxide matrix, and optionally other materials and modifiers, such as a clay.

Molecular sieves that are suitable for use in the present invention can be both zeolitic ("zeolites") and non-zeolitic microporous crystalline frameworks. The crystalline frameworks are three-dimensional and have well defined pore diameters. "Small pore" molecular sieves are defined herein as molecular sieves with pores having a diameter of less than about 5.0 Angstroms. "Medium pore" molecular sieves are defined as molecular sieves with pores having a diameter in the range of from about 5 to about 10 Angstroms. Both small pore and medium pore molecular sieves which have a pore diameter of smaller than about 10 Angstroms, are suitable for use in the invention.

Zeolites, which are suitable for the use in invention include, but are not necessarily limited to the structural types of CHA, MFI, ERI, and substituted examples of these structural types described in W. M. Meier and D. H. Olsen, *Atlas of Zeolite Structural Types* (Butterworth Heineman—3rd ed. 1997), incorporated herein by reference. Preferred zeolites are chabazite, erionite, ZSM-34, and ZSM-5. The zeolites may contain framework and non-framework substituents or modifiers, including but not necessarily limited to Ge, B, Ga, In, Mg, Ca and Ba.

Non-zeolitic molecular sieves which are suitable for use in the present invention include, but are not necessarily limited to silicoaluminophosphates ("SAPO's"). SAPO's have a three-dimensional microporous crystalline framework of $PO_2^+$, $AlO_2^-$, and $SiO_2$ tetrahedral units. Suitable SAPO's include, but are not necessarily limited to SAPO-11, 17, 18, 34, 44, and 56. A preferred SAPO is SAPO-34, which may be synthesized according to U.S. Pat. No. 4,440,871, incorporated herein by reference, and Zeolites, Vol. 17, pp 512–522 (1996), incorporated herein by reference.

SAPO's with substituents also may be used in the present invention. These substituted SAPO molecular sieves are known as "MeAPSO's" and "MeAPO's." MeAPO's may or may not contain silicon. Examples of suitable metals (Me) are nickel, iron, cobalt, manganese and magnesium.

SAPO, MeAPO and MeAPSO molecular sieves can be further modified using, for example, magnesium, calcium, strontium, barium, lanthanides, actinides and mixtures thereof. A preferred modifier is strontium. Preferred modified SAPO's are strontium modified SAPO-17, SAPO-18 and SAPO-34.

The amount of molecular sieve in the finished catalyst is in the range of from about 3 wt % to about 99 wt %, preferably from about 5 wt % to about 90 wt %, and more preferably from about 10 wt % to about 80 wt %.

To make the molecular sieves suitable for use as catalysts in fluidized bed or moving bed reactor systems, an inorganic oxide matrix usually is needed in the catalyst formulation to provide physical strength and better heat transfer, among other desirable properties. For the present invention, the inorganic oxide matrix preferably is formed from a sol selected from the group of a silica sol, an alumina sol, and mixtures thereof.

The terms "silica sol" and "alumina sol" mean that the sol predominantly comprises silica or alumina, respectively. The sol may be further identified by a ratio of silica to alumina or vice versa. Typically, both silicon and aluminum atoms will be present in either a silica sol or an alumina sol. A preferred sol has a relatively low viscosity. A sol having the preferred characteristics will have high reliability in forming the desired dry inorganic oxide matrix component.

The inorganic oxide sol in the catalyst essentially is a "glue" which binds the group of catalyst components together. Upon drying the inorganic oxide sol, an inorganic oxide matrix is formed. Preferably, the individual catalyst components which are glued together are about 0.3 to 10.0 micron in size. Between the individual catalyst components, the inorganic oxide matrix component formed in the final product preferably has a measurable diameter of less than 100 microns.

Silica sols useful in the present invention may be derived from a sodium silicate which is typically neutralized using an aluminum sulfate hydrate/sulfuric acid solution. Aluminum from the aluminum sulfate/sulfuric acid solution typically is incorporated into the silica sol. The silica sol preferably has a Si/Al ratio of greater than about 1, more preferably greater than about 5. The Si/Al ratio may vary within the preferred ranges, depending on the nature of the species which are to be bound by the inorganic oxide matrix.

A preferred inorganic oxide sol is made by reacting a solution of sodium silicate with a solution of aluminum sulfate hydrate and sulfuric acid under conditions of rapid mixing. The pH of inorganic oxide sol preferably is in the range of from about 1 to about 4. Most preferably, the pH is in the range of from about 2 to about 4. The preferred pH may be attained by mixing the particular components of the sol in solution at a pH as low as about 1 and raising the pH to about 3 using any suitable silicate solutions. Preferably, the pH is raised using a sodium silicate solution having a pH higher than about 5 and lower than about 10. The pH of the inorganic oxide sol in the invention can be measured using standard glass electrodes or other methods known to those of ordinary skills in the art. The inorganic oxide sol may be made using a batch, continuous, or semi-continuous process.

The amount of the inorganic oxide sol used in the invention is selected to cause the amount of the resultant inorganic oxide matrix in the finished catalyst to be in the range of from about 2 wt % to about 98 wt %, preferably from about 5 wt % to about 90 wt %, and more preferably from about 10 wt % to about 80 wt %.

The catalysts of the present invention preferably are made using an external phosphorus source. The external phosphorus source can be inorganic or organic. Preferably, the external phosphorus source is a material soluble in water. Examples of suitable phosphorus sources include, but are not necessarily limited to ortho-phosphoric acid, meta-phosphoric acid, pyro-phosphoric acid, ammonium dihydrogen phosphate, diammonium hydrogen phosphate, ammonium phosphate, ammonium phosphite, ammonium hypophosphite, ammonium dihydrogen phosphite, and mixtures thereof.

The amount of the external phosphorus source used in the method is selected to cause the amount of the resultant external phosphorus in the finished catalyst to be in the range of from about 0.1 wt % to about 25 wt %, preferably from about 1.0 wt % to about 20 wt %, and more preferably from about 5 wt % to about 10 wt %.

Catalyst made according to the present invention also may contain other components, preferably a kaolin clay. The amount of the clay in the finished catalyst is in the range of from about 10 wt % to about 90 wt %, preferably from about 15 wt % to about 85 wt %, and more preferably from about 20 wt % to about 80 wt %.

In order to make the catalysts of the present invention, the molecular sieve, the inorganic oxide sol, the external phosphorus source, and optionally a clay are mixed to form a slurry. The mixing can be carried out at a temperature in the range of from about −10° C. to about 50° C. Pressure and atmosphere are not critical for mixing. The mixing can be carried out at a pressure in the range of from about 100 kPa to about 500 kPa. Air and nitrogen are a preferred atmosphere for the mixing step. The resultant slurry may be colloid-milled in the range of from about one to about five times for a total time period in the range of from about 3 seconds to about 5 minutes to obtain a desired particle texture, particle size and/or particle size distribution.

The slurry then is dried using known means. Preferably the slurry is spray dried. In spray drying, the slurry is fed into a nozzle which breaks the slurry into small particles. The particles then are dried in a co-current or counter-current flow of air through the spray drier. A dry powder catalyst is recovered. Alternately, the dry powder catalyst may be ground in the range of from about one to about five times, for a total period of time in the range of from about one to about five hours, in order to obtain a desired particle size and/or particle size distribution.

The spray-dried catalysts, with or without grinding, may be used for conversions of hydrocarbons and oxygenates without further treatment. In another embodiment, the spray-dried catalysts are calcined at an elevated temperature. Calcination at an elevated temperature may increase catalyst stability and performance consistency. The calcination temperature is in the range of from about 400° C. to about 1000° C., preferably in the range from about 500° C. to about 850° C. The calcination time period depends on the catalyst formulation and the temperature of calcination. The period should be in the range of from about 0.5 hours to about 48 hours, preferably from about 2 hours to about 24 hours. The pressure and the atmosphere used during calcination are not critical, and should be selected to give the desired oxidation states of any easily reducible or oxidizable elements present in the catalyst. The sprayed dried catalysts also may be ion exchanged before or after the calcination.

Catalysts made according to the present invention have increased attrition resistance properties. Resistance to attrition is a measurement of the hardness of a catalyst, or how well the catalyst resists wear under test or process conditions. A catalyst with good attrition resistance will last longer and is more desirable than a catalyst with poor attrition resistance. Poor attrition resistance leads to the production of more fines that may escape from the processing units and cause environmental problems.

The test used to measure attrition resistance according to the present invention is the "extended attrition test." A Jet Cup Attritor is used. A sample of 6 grams of the catalyst is tested for 4 hours. Attrition products (<20 microns) are measured gravimetrically and the data are used to calculate the attrition rate of the catalyst. An extended attrition index is obtained by measuring the wieght amount of particles smaller than about 2.6 microns generated during the test. Generally, the fewer particles having a diameter smaller than about 2.6 Angstroms produced, the more attrition resistant the catalyst. The attrition products also are analyzed for particle size distribution using a Leeds & Northrop Microtrac® Small Particle Analyzer. Surface areas and pore volumes are measured using Coulter Omnisorb® 610 instrument.

Catalysts made according to the present invention can be used to convert oxygenates to olefins or to motor gasoline. The catalysts also can be used to convert hydrocarbons to lower molecular weight products, particularly to lower olefins (ethylene, propylene, and butenes).

Oxygenates can be converted to olefins and/or gasoline by contacting a feed with a catalyst of the present invention under conditions effective to produce olefins and/or gasoline. Preferred olefins are lower olefins—ethylene, propylene, butenes, and mixtures thereof.

Oxygenates suitable for use in the feed include, but are not necessarily limited to aliphatic alcohols, ethers, carbonyl compounds (aldehydes, ketones, carboxylic acids, esters, carbonates and the like), alkyl halides, alkyl amines, and mixtures thereof Preferred oxygenates are methanol, ethanol, n-propanol, isopropanol, n-butanol, sec-butanol, dimethyl ether, methylethyl ether, diethyl ether, dimethyl carbonate, and mixtures thereof.

Effective conditions for oxygenate conversions are: temperature in the range from about 200° C. to about 800° C.; pressure in the range of from about 1 kPa to about 2 Mpa; Weight Hourly Space Velocity (WHSV) in the range of from about 0.01 to about 10,000 $h^{-1}$. Because the feed may contain diluents and the catalyst may contain filler and/or binder materials, WHSV is calculated on the weight of the oxygenate feed itself and the weight of the molecular sieve component in the catalyst. Diluents can be mixed with the oxygenates as feed. The amounts of diluents used are in the range of from about 0 wt % to about 95 wt % of the total feed. Suitable diluents include but are not necessarily limited to water (steam), $CO_2$, hydrogen, nitrogen, argon, and mixtures thereof.

The oxygenate feed is contacted with the catalyst in a conversion reactor under effective conditions for conversion. A suitable conversion reactor is a fixed bed reactor, a moving bed reactor, a fluidized bed reactor, or other similar types of reactor. The products and any unreacted feedstock then are separated from the catalyst. The products are purified. Unreacted feedstock may be recycled back to the conversion reactor or otherwise disposed of If the catalyst is deactivated, it is regenerated. Regeneration can be carried out in the conversion reactor or in a separate regeneration reactor. Regeneration usually is carried out at elevated temperatures, 350° C. to 950° C., and in the presence of an oxygen containing atmosphere. Sometimes treating a deactivated catalyst with hydrogen at elevated temperatures also is effective to regenerate the catalytic performance of the oxygenate conversion catalyst.

Catalysts of the present invention also can be used for hydrocarbon conversions. Products of molecular weights lower than the feedstocks are produced. Hydrocarbon feedstocks include, but are not necessarily limited to naphtha and similar hydrocarbons. The feedstocks comprise mostly non-aromatic compounds with at least five carbon atoms. Preferred products comprise lower olefins (ethylene, propylene, and butenes) and aromatics.

Typical reaction conditions for the hydrocarbon conversions are: temperature in the range of from about 250 to about 900° C.; pressure in the range of from about 1 kPa to about 2 Mpa; WHSV in the range of from about 0.01 to about 10,000 $h^{-1}$. Because the feed may contain diluents and the catalyst may contain filler and/or binder materials, WHSV is calculated on the weight of the hydrocarbon feed itself and the weight of the molecular sieve component in the catalyst. Diluents such as water (steam), $CO_2$, hydrogen, nitrogen, and others can be mixed with the feedstocks. The amounts of diluents used are in the range of from about 0 wt % to about 95 wt % of the total feed.

The hydrocarbon feed is contacted with the catalyst in a conversion reactor under effective conditions for conversion. A suitable conversion reactor is a fixed bed reactor, a moving bed reactor, a fluidized bed reactor, or other similar types of reactor. The products and any unreacted feedstock then are separated from the catalyst. The products are purified. Unreacted feedstock may be recycled back to the conversion reactor or otherwise disposed of. If the catalyst is deactivated, it is regenerated. Regeneration can be carried out in the conversion reactor or in a separate regeneration reactor. Regeneration usually is carried out at elevated temperatures, 350° C. to 950° C., and in the presence of an oxygen containing atmosphere. Sometimes treating a deactivated catalyst with hydrogen at elevated temperatures also is effective to regenerate the catalytic performance of the hydrocarbon conversion catalyst.

The present invention will be better understood with reference to the following examples that are intended to illustrate, but not to limit the scope or spirit of the invention. The invention is solely defined by the claims.

EXAMPLE I

A catalyst was prepared according to the present invention as follows:

To 28.8 lb of water was added 21.2 lb of "N"-brand sodium silicate. 32.8 lb of the solution was placed in the "on-balance" tank and the remaining solution was placed in the "off-balance" tank. To 28.1 lb of water was added 5.00 lb of concentrated sulfuric acid (98 wt %) and 7.09 lb of aluminum sulfate pentadecahydrate. The acid alum was pumped to a slop tank and then the sodium silicate solution was turned on. When the pH of the emerging stream rose to 3.0, the rate of the silicate solution was not increased further. The pH of the emerging slurry was adjusted with rate of the sodium silicate solution. The silica sol stream was then diverted to an on-balance drum and switched to the "on-balance" sodium silicate tank. 10.4 lb of sulfated aluminosilicate sol was pumped out. To 5.8 lb of water was added 0.87 lb of 20 wt % $(NH_4)H_2PO_4$ solution, followed by 3.75 lb of Hydrite® UF kaolin (from Dry Branch), the sulfated alumino-silicate sol and 1.29 lb of SAPO-34 (0.966 solids), obtained from UOP. The resulting slurry was colloid milled twice. The slurry was spray dried in a Anhydro PV Spray Drier® at Moyno pump setting 2.1; 10,000 rpm; 288° C. inlet temperature and the outlet temperature between 177° C. and 157° C. 3.0 lb of coarse catalyst product and 0.9 lb of fines were collected from the spray drier.

The resultant catalyst was subjected to the extended attrition test to determine its extended attrition index. As shown in TABLE I, the catalyst exhibited a good extended attrition index of 5. Commercially available catalysts also were subjected to the test under similar attrition testing conditions. The commercial catalysts tested were Engelhard Reduction®, Grace Spectra®, Grace Ramcat®, Akzo Advance®, and Akzo Vision® catalysts. The catalyst prepared according to this example was significantly more attrition resistant than the commercial catalysts under comparable attrition testing conditions.

EXAMPLE II

Another catalyst was prepared according to the present invention as follows:

To 28.8 lb of water was added 21.2 lb of "N"-brand sodium silicate. 32.8 lb of the solution was placed in the "on-balance" tank and the remaining solution was placed in the "off-balance" tank. Separately, to 28.1 lb of water was added 5.00 lb of concentrated sulfuric acid (98 wt %) and 7.09 lb of aluminum sulfate pentadecahydrate. The acid alum was pumped to a slop tank and then the sodium silicate solution was turned on. When the pH of the emerging stream rose to 3.0, the rate of the silicate solution was not increased further. The pH of the emerging slurry was adjusted with rate of the sodium silicate solution. The silica sol stream was then diverted to an on-balance drum and switched to the "on-balance" sodium silicate tank. 10.4 lb of sulfated alumino-silicate sol was pumped out. To 5.8 lb of water was added 0.87 lb of 20 wt % $(NH_4)H_2PO_4$ solution, followed by 1.5 lb of Hydrite® UF kaolin, the sulfated alumino-silicate sol and 2.58 lb of SAPO-34 (0.966 solids), obtained from UOP. The resulting slurry was colloid milled twice. The slurry was spray dried in a Anhydro® PV Spray Drier at Moyno pump setting 2.1; 10,000 rpm; 288° C. inlet temperature and the outlet temperature between 177° C. and 152° C. 2.7 lb of coarse catalyst product and 1.0 pound of fines were collected from the spray drier.

The resultant catalyst was subjected to the extended attrition test to determine its extended attrition index. As shown in TABLE I, the catalyst exhibited a good extended attrition index of 3. The catalyst prepared according to this example was significantly more attrition resistant than commercial catalysts under comparable attrition testing conditions.

EXAMPLE III

The catalyst in EXAMPLE I was calcined at 760° C. for three hours. The resultant catalyst was subjected to the extended attrition test to determine its extended attrition index. As shown in TABLE I, the calcined catalyst exhibited an extended attrition index of 17. Compared with the catalyst prepared in EXAMPLE I, the calcined catalyst was less attrition resistant. Under comparable attrition testing conditions, the calcined catalyst prepared in this EXAMPLE was as attrition resistant as a series of acceptable commercial catalysts.

EXAMPLE IV

The catalyst in EXAMPLE II was calcined at 760° C. for three hours. The resultant catalyst was subjected to the extended attrition test to determine its extended attrition index. As shown in TABLE I, the calcined catalyst exhibited an extended attrition index of 13. Compared with the catalyst prepared in EXAMPLE II, the calcined catalyst was less attrition resistant. Under comparable attrition testing conditions, the calcined catalyst prepared in this EXAMPLE was as attrition resistant as a series of acceptable commercial catalysts.

TABLE I

| Sample | Surface Area (m²/g) Pore Volume (cc/g) | Extended Attrition | % Microfines | Extended Attrition Index |
|---|---|---|---|---|
| Example I | 111/0.07 | 30 | 16 | 5 |
| Example II | 234/0.08 | 37 | 8 | 3 |
| Example III | 11/0.05 | 48 | 35 | 17 |
| Example IV | 11/0.08 | 53 | 25 | 13 |

Attrition test results showed that catalysts of the present invention made significantly fewer microfines than commercial catalysts. Depending on the formulation and preparation conditions, the catalysts of the present invention produced microfines in a range of from about 8 to about 35. Under comparable conditions, commercial catalysts generated microfines in the range of from about 18 to about 52.

The extended attrition index of the fresh spray-dried catalysts prepared according to the present invention were significantly more attrition resistant than the tested commercial catalysts, and the calcined catalysts made according to the invention were at least as attrition resistant as the tested commercial catalysts.

Molecular sieves themselves generally are not considered to be good binding materials. Normally, the amount of fines produced by a catalyst increases with the molecular sieve content. It was surprising to observe that the catalysts with highest amounts of SAPO-34 incorporated in the formulations gave a better extended attrition index or produced less mircofines. The catalysts in EXAMPLE II and IV, with about 50 wt % SAPO-34, showed fewer microfines and lower attrition index than the catalysts in EXAMPLE I and EXAMPLE III which have about 25 wt % SAPO-34.

The foregoing results demonstrate that the catalysts prepared according to the method of this invention produced fewer microfines than commercial catalysts. The invented catalysts also showed increased attrition resistance over commercial catalysts.

Persons of ordinary skill in the art will recognize that many modifications may be made to the present invention without departing from the spirit and scope of the present invention. The embodiments described herein are meant to be illustrative only and should not be taken as limiting the invention, which is defined in the following claims.

We claim:

1. A method of making a silicoaluminophosphate catalyst, comprising:

providing as catalyst components a silicoaluminophosphate molecular sieve having a pore diameter of smaller than 5 Angstroms; an inorganic oxide sol selected from the group consisting of silica sol, alumina sol, and mixtures thereof; and an external phosphorus source selected from the group consisting of ortho-phosphoric acid, meta-phosphoric acid, pyro-phosphoric acid, ammonium dihydrogen phosphate, diammonium hydrogen phosphate, ammonium phosphate, ammonium phosphite, ammonium hypophosphite, ammonium dihyrogen phosphite, and mixtures thereof;

mixing together the catalyst components to form a slurry; and drying the slurry to form the catalyst.

2. The method of claim 1, wherein the inorganic oxide sol is provided in a range of 2.0 wt. % to 98 wt. %.

3. The method of claim 1, wherein the external phosphorus source is provided in a range of from 0.1 wt. % to 25 wt. %.

4. The method of claim 1, wherein the silicoaluminophosphate molecular sieve is SAPO-34.

5. The method of claim 1, wherein a kaolin clay is further provided as a catalyst component.

6. The method of claim 1, wherein the slurry is spray dried.

7. The method of claim 1, further comprising calcining the dried slurry.

8. A catalyst made by the method of claim 1–4, 5, 6 or 7.

* * * * *